United States Patent
Albrecht et al.

(10) Patent No.: US 6,777,517 B1
(45) Date of Patent: Aug. 17, 2004

(54) COPOLYMERS BASED ON UNSATURATED MONO-OR DICARBOXYLIC ACID DERIVATIVES AND OXYALKYLENE GLYCOL ALKENYL ETHERS, METHOD FOR THE PRODUCTION AND USE THEREOF

(75) Inventors: Gerhard Albrecht, Tacherting (DE); Christian Hübsch, Gmund (DE); Hubert Leitner, Ennstal (AT); Harald Grassl, Schönau (DE); Alfred Kern, Kirchweidach (DE)

(73) Assignee: Degussa Construction Chemicals GmbH, Trostberg (DE)

( * ) Notice: Subject to any disclaimer, the term of this patent is extended or adjusted under 35 U.S.C. 154(b) by 0 days.

(21) Appl. No.: 09/937,810

(22) PCT Filed: Mar. 14, 2000

(86) PCT No.: PCT/EP00/02251

§ 371 (c)(1),
(2), (4) Date: Sep. 27, 2001

(87) PCT Pub. No.: WO00/77058

PCT Pub. Date: Dec. 27, 2000

(30) Foreign Application Priority Data

Jun. 11, 1999 (DE) .......................................... 199 26 611

(51) Int. Cl.$^7$ ................................................. C08F 20/06
(52) U.S. Cl. .................... 526/317.1; 526/271; 526/333; 526/318.2; 526/279
(58) Field of Search ................................. 526/271, 333, 526/318.2, 279, 317.1

(56) References Cited

U.S. PATENT DOCUMENTS

| | | | |
|---|---|---|---|
| 4,741,790 A | | 5/1988 | Hawe et al. |
| 5,362,323 A | | 11/1994 | Koyata et al. |
| 5,798,425 A | * | 8/1998 | Albrecht et al. ............ 526/271 |
| 6,211,317 B1 | | 4/2001 | Albrecht et al. |

FOREIGN PATENT DOCUMENTS

| | | |
|---|---|---|
| DE | 195 13 126 A1 | 10/1998 |
| DE | 198 34 173 A1 | 2/1999 |
| EP | 0 537 870 A1 | 4/1993 |
| EP | 0 619 277 B1 | 10/1994 |
| EP | 0 715 635 B1 | 6/1996 |
| EP | 0 736 553 | 10/1996 |
| EP | 0 798 320 A2 | 10/1997 |
| EP | 0 894 811 | 2/1999 |

\* cited by examiner

Primary Examiner—Ling-Siu Choi
(74) Attorney, Agent, or Firm—Fulbright & Jaworski L.L.P.

(57) ABSTRACT

Copolymers based on unsaturated monocarboxylic or dicarboxylic acid derivatives, oxyalkylene glycol alkenyl ethers, vinylic polyalkylene glycol, polysiloxane or ester compounds and the use thereof as additives for aqueous suspensions based on mineral or bituminous binders are described. The copolymers give aqueous suspensions of building materials excellent processing properties even in very small amounts, without delaying strength developments. In addition, when the copolymers of the invention are used, a drastic decrease in the water/binder ratio still leads to highly fluid building materials without segregation of individual constituents from the building material mixture occurring.

20 Claims, No Drawings

COPOLYMERS BASED ON UNSATURATED MONO-OR DICARBOXYLIC ACID DERIVATIVES AND OXYALKYLENE GLYCOL ALKENYL ETHERS, METHOD FOR THE PRODUCTION AND USE THEREOF

The present invention relates to copolymers based on unsaturated monocarboxylic or dicarboxylic acid derivatives and oxyalkylene glycol alkenyl ethers, a process for preparing them and the use of these copolymers as additives for aqueous suspensions of inorganic or organic solids.

It is known that additives in the form of dispersants are often added to aqueous slurries of pulverulent inorganic or organic substances such as clays, porcelain slips, silicate flour, chalk, carbon black, ground rock, pigments, talc, polymer powders and hydraulic binders for improving their processability, i.e. kneadability, spreadability, sprayability, pumpability or flow. These additives, which generally contain ionic groups, are able to break up agglomerates of solids, disperse the particles formed and in this way improve the processability of, in particular, highly concentrated suspensions. This effect is also exploited in a targeted manner in the production of building material mixtures based on cement, lime and hydraulic binders based on calcium sulfate, optionally in a mixture with organic (e.g. bituminous) components and also for ceramic compositions, refractory compositions and oilfield chemicals.

To convert these building material mixtures based on the abovementioned binders into a ready-to-use, processable form, it is generally necessary to use significantly more make-up water than would be necessary for the subsequent hydration or curing process. The voids formed in the component as a result of later evaporation of the excess water leads to significantly impaired mechanical strengths and stabilities.

To reduce this excess water content at a given processing consistency and/or to improve the processability at a given water/binder ratio, use is made of additives which are generally referred to as water reduction agents or fluidizers. Known agents of this type are, in particular, polycondensation products based on naphthalenesulfonic or alkylnaphthalene-sulfonic acids (cf. EP-A-0 214 412) or melamine-formaldehyde resins containing sulfonic acid groups (cf. DE-C 16 71 017).

A disadvantage of these additives is the fact that their excellent fluidizing action, especially in concrete construction, is maintained over only a short period of time. The deterioration in the processability of concrete mixtures ("slump loss") in a short time can lead to problems especially where there is a long period of time between make-up and installation of the fresh concrete, for example as a result of long conveyance and transport paths.

An additional problem arises when such fluidizers are employed in mining and in interior applications (drying of cardboard-faced plasterboard, anhydrite screed applications, manufacture of finished concrete components), since release of the toxic formaldehyde present in the products as a result of the manufacturing method can occur and thus lead to considerable occupational hygiene problems. For this reason, attempts have already been made to develop formaldehyde-free concrete fluidizers based on maleic monoesters and styrene, for example as described in EP-A-0 306 449. The flow of concrete mixtures can be maintained over a sufficiently long period of time by means of these additives, but the original, very high dispersant action is lost very quickly after storage of the aqueous fluidizer formulation as a result of hydrolysis of the polymeric ester.

This problem does not occur in the case of fluidizers based on alkylpolyethylene glycol allyl ethers and maleic anhydride as described in EP-A-0 373 621. However, these products are, like those described above, surface-active compounds which introduce undesirably high proportions of air pores into the concrete mixture, resulting in deterioration in the finished state [sic] and stability of the cured building material.

For this reason it is necessary to add antifoams such as tributyl phosphate, silicone derivatives and various water-insoluble alcohols in concentrations of from 0.1 to 2% by weight, based, on the solids content, to the aqueous solutions of these polymeric compounds. Mixing-in these antifoam components and maintaining a storage-stable homogeneous form of the corresponding formulations is very difficult even when these antifoams are added in the form of emulsions.

The problem of demixing can be solved by complete or at least partial incorporation of a foam-inhibiting or air-repellant structural unit into the copolymer, as described in DE 195 13 126 A1.

However, it has been found that the high effectiveness and the low "slump loss" of the copolymers described here often leads to unsatisfactory 24-hour strengths of the concrete. Furthermore, such copolymers do not have optimum properties, especially where a particularly dense and therefore high-strength and high-stability concrete is to be produced using the lowest possible proportion of water and steam curing (finished parts industry) for accelerating the curing process is to be dispensed with.

It is therefore an object of the invention to provide new copolymers which do not have the abovementioned disadvantages of the known agents, i.e. which maintain the processability of highly concentrated building material mixtures for an appropriate length of time even in small amounts and at the same time give an increased strength in the cured state of the building material due to a drastic decrease in the water/binder ratio.

This object is achieved according to the invention by copolymers based on radicals of unsaturated monocarboxylic or dicarboxylic acid derivatives and oxyalkylene glycol alkenyl ethers, which are characterized in that they comprise a) from 51 to 95 mol % of structural units of the formula Ia and/or Ib and/or Ic

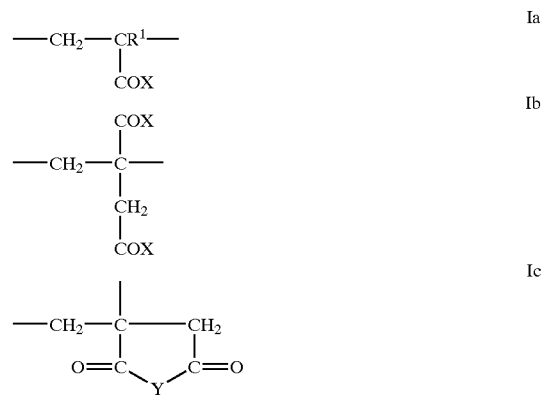

where $R^1$=hydrogen or an aliphatic hydrocarbon radical having from 1 to 20 carbon atoms, $X = O_aM$, $-O-(C_mH_{2m}O)_{n-R^2}$, $-NH-(C_mH_{2m}O)_{n-R^2}$, M=hydrogen, a monovalent or divalent metal cation, an ammonium ion or an organic amine radical, a=½ or 1, $R^2$=hydrogen, an aliphatic hydrocarbon radical having from 1 to 20 carbon atoms, a cycloaliphatic hydrocarbon radical having from 5 to 8 carbon atoms, a substituted or unsubstituted aryl radical having from 6 to 14 carbon atoms,

Y=O, $NR^2$, m=2 to 4 and n=0 to 200, b) from 1 to 48.9 mol % of structural units of the general formula II

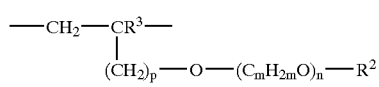

II where $R^3$ is hydrogen or an aliphatic hydrocarbon radical having from 1 to 5 carbon atoms, p is from 0 to 3 and $R^2$, m and n are as defined above, c) from 0.1 to 5 mol % of structural units of the formula IIIa or IIIb

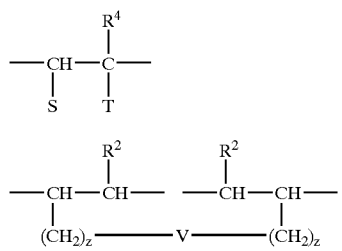

IIIa

IIIb where

S=H, —$COO_aM$, —$COOR^5$,

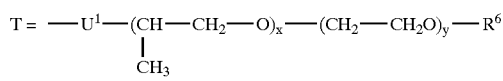

—W—$R^7$
—CO—[NH—$(CH_2)_3$]$_s$—W—$R^7$
—CO—O—$(CH_2)_z$—W—$R^7$
—$(CH_2)_z$—V—$(CH_2)_z$—CH=CH—$R^2$
—$COOR^5$ in the case of S=—$COOR^5$ or $COO_aM$ $U^1$=—CO—NH—, —O—, —$CH_2$O—

$U^2$=—NH—CO—, —O—, —$OCH_2$—

V=—O—CO—$C_6H_4$—CO—O— or —W—

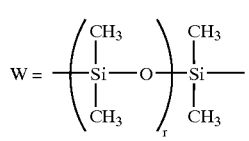

$R^4$=H, $CH_3$, $R^5$=an aliphatic hydrocarbon radical having from 3 to 20 carbon atoms, a cycloaliphatic hydrocarbon radical having from 5 to 8 carbon atoms, an aryl radical having from 6 to 14 carbon atoms,

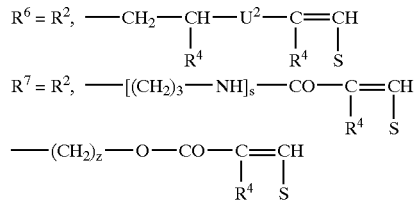

r=2 to 100 s=1, 2 z=0 to 4 x=1 to 150 y=0 to 15 and d) from 0 to 47.9 mol [lacuna] of structural units of the general formula IVa and/or IVb

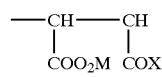

IVa

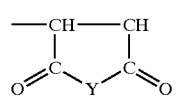

IVb where a, M, X and Y are as defined above.

It has surprisingly been found that very small amounts of the copolymers of the invention based on unsaturated monocarboxylic or dicarboxylic acid derivatives and oxyalkylene glycol alkenyl ethers added to aqueous building material suspensions give the suspensions excellent processing properties without delaying strength development. It was particularly surprising that a drastic decrease in the water/binder ratio still leads to highly fluid building materials when the copolymers of the invention are added and no segregation of individual constituents of the building material mixture occurs.

The copolymers of the invention comprise at least three, but preferably four, structural units a), b), c) and d). The first structural unit a) is a monocarboxylic or dicarboxylic acid derivative having the general formula Ia, Ib or Ic.

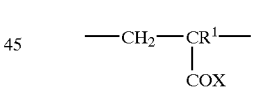

Ia

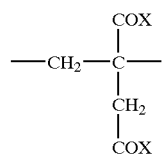

Ib

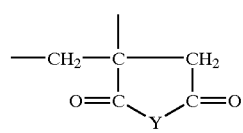

Ic

In the case of the monocarboxylic acid derivative Ia, $R^1$ is hydrogen or an aliphatic hydrocarbon radical having from 1 to 20 carbon atoms, preferably a methyl group. X in the structures Ia and Ib is —$O_aM$ and/or —O—$(C_mH_{2m}O)_n$—$R^2$ or —NH—$(C_mH_{2m}O)_n$—$R^2$, where M, a, m, n and $R^2$ are defined as follows:

M is hydrogen, a monovalent or divalent metal cation, ammonium, an organic amine radical, and a=½ or 1 depending on whether M is a monovalent or divalent cation. Organic amine radicals are preferably substituted ammonium groups derived from primary, secondary or tertiary $C_{1-20}$-alkylamines, $C_{1-20}$-alkanolamines, $C_{5-8}$-cycloalkylamines and $C_{8-14}$-arylamines. Examples of suitable amines from which these radicals are derived are methylamine, dimethylamine, trimethylamine, ethanolamine, diethanolamine, triethanolamine, methyldiethanolamine, cyclohexylamine, dicyclohexylamine, phenylamine, diphenylamine in the protonated (ammonium) form.

$R^2$ can be hydrogen, an aliphatic hydrocarbon radical having from 1 to 20 carbon atoms, a cycloaliphatic hydrocarbon radical having from 5 to 8 carbon atoms, an aryl radical having from 6 to 14 carbon atoms which may also be substituted, m=2 to 4 and n=0 to 200. The aliphatic hydrocarbon radicals can be linear or branched and saturated or unsaturated. Preferred cycloalkyl radicals are cyclopentyl or cyclohexyl radicals, preferred aryl radicals are phenyl or naphthyl radicals which may also be substituted by groups such as —CN, —COOR$^1$, —R$^1$, —OR$^1$ and preferably by hydroxyl, carboxyl or sulfonic acid groups.

In place of or in addition to the dicarboxylic acid derivative of the formula Ib, the structural unit a) (monocarboxylic or dicarboxylic acid derivative) can also be present in cyclic form corresponding to formula Ic, where Y=O (acid anhydride) or NR$^2$ (acid imide) with the above-described meanings for $R^2$.

The second structural unit b) corresponds to formula II

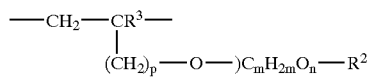

and is derived from oxyalkylene glycol alkenyl ethers. m, n and $R^2$ are as defined above. $R^3$ is hydrogen or an aliphatic hydrocarbon radical having from 1 to 5 carbon atoms which may be linear or branched or saturated or unsaturated. p can be from 0 to 3.

In the formulae Ia, Ib and II, m is preferably 2 and/or 3 so that the structural units are polyalkylene oxide groups derived from polyethylene oxide and/or polypropylene oxide. In a further preferred embodiment, p in formula II is 0 or 1, i.e. the structural units are vinyl and/or alkyl polyalkoxylates.

The third structural unit c) corresponds to the formula IIIa or IIIb

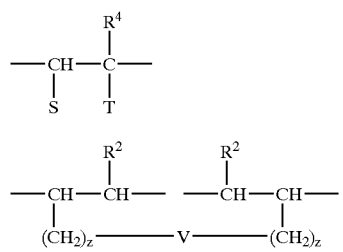

In the formula IIIa, $R^4$ can be H or $CH_3$ depending on whether the structural units are acrylic or methacrylic acid derivatives. S can be —H, —COO$_a$M or —COOR$^5$, where a and M are as defined above and $R^5$ is an aliphatic hydrocarbon radical having from 3 to 20 carbon atoms, a cycloaliphatic hydrocarbon radical having from 5 to 8 carbon atoms or an aryl radical having from 6 to 14 carbon atoms. The aliphatic hydrocarbon radical can be linear or branched, saturated or unsaturated. Preferred cycloaliphatic hydrocarbon radicals are cyclopentyl or cyclohexyl radicals; preferred aryl radicals are phenyl or naphthyl radicals. In the case of T=—COOR$^5$, S=COO$_a$M or —COOR$^5$. When both T and S are COOR$^5$, the corresponding structural units are derived from dicarboxylic esters.

Apart from these ester groups, the structural units c) may also comprise other hydrophobic structural elements. These include polypropylene oxide or polypropylene oxide-polyethylene oxide derivatives of the formula

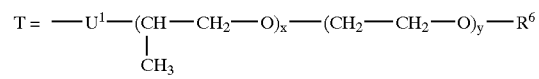

x is from 1 to 150 and y is from 0 to 15. The polypropylene oxide(polyethylene oxide) derivatives can be linked via a group $U^1$ to the ethyl radical of the structural unit c) corresponding to the formula IIIa, where $U^1$=—CO—NH—, —O— or —CH$_2$—O. The structural unit is thus the amide, vinyl ether or allyl ether corresponding to the structural unit of the formula IIIa. $R^6$ may in turn be as defined for $R^2$ (see above) or be

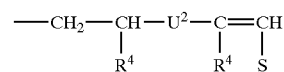

where $U^2$=—NH—CO—, —O— or —OCH$_2$—, and S is as defined above. These compounds are polypropylene oxide (-polyethylene oxide) derivatives of the bifunctional alkenyl compounds corresponding to the formula IIIa.

As a further hydrophobic structural element, the compounds of the formula IIIa may contain polydimethylsiloxane groups, which in the formula IIIa corresponds to T=—W—R$^7$.
W is

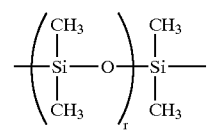

(hereinafter referred: to as a polydimethylsiloxane group), $R^7$ can be as defined for $R^2$ and r can be from 2 to 100.

The polydimethylsiloxane group can not only be bound directly to the ethylene radical of the formula IIIa, but also via the group —CO—[NH—(CH$_2$)$_3$]$_s$—W—R$^7$ or —CO—O(CH$_2$)$_z$—W—R$^7$, where $R^7$ is preferably as defined for $R^2$ and s=1 or 2 and z=0 to 2. $R^7$ may also be a radical of the formula

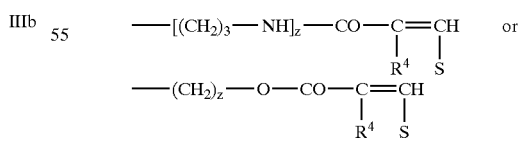

The compounds are then bifunctional ethylene compounds of the formula IIIa which are linked to one another via the respective amide or ester groups, with only one ethylene group having been copolymerized.

A similar situation applies to the compounds of the formula IIIa, in which T=(CH$_2$)$_z$—V—(CH$_2$)$_z$—CH=CH—R$^2$, where z=0 to 4, V is either a polydimethylsiloxane radical W or a —O—CO—C$_6$H$_4$—CO—O— radical and R$^2$ is as defined above. These compounds are derived from the corresponding dialkylphenyldicarboxylic esters or dialkylenepolydimethylsiloxane derivatives.

Within the scope of the present invention, it is also possible for not only one but also both ethylene groups of the bifunctional ethylene compounds to be copolymerized. This gives structural units corresponding to the formula IIIb

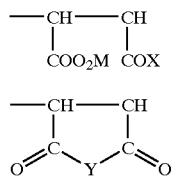

IIIb where R$^2$, V and z are as defined above.

The fourth structural unit d) is derived from an unsaturated dicarboxylic acid derivative and has the formula IVa and/or IVb

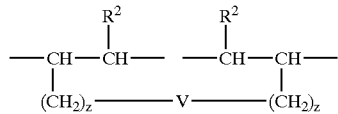

IVa

IVb where a, M, X and Y are: as defined above.

According to the invention, the copolymers of the invention comprise from 51 to 95 mol % of structural units of the formula Ia and/or Ib and/or Ic, from 1 to 48.9 mol % of structural units of the formula II, from 0.1 to 5 mol % of structural units of the formula IIIa and/or IIIb and from 0 to 47.9 mol % of structural units of the formula IVa and/or IVb.

Preference is given to copolymers comprising from 55 to 75 mol % of structural units of the formula Ia and/or Ib, from 19.5 to 39.5 mol % of structural units of the formula II, from 0.5 to 2 mol % of structural units of the formula IIIa and/or IIIb and from 5 to 20 mol % of structural units of the formula IVa and/or IVb.

In a preferred embodiment, the copolymers of the invention further comprise up to 50 mol %, in particular up to 20 mol %, based on the sum of the structural units a to d, of structures which are derived from monomers based on vinyl or (meth)acrylic acid derivatives such as styrene, α-methylstyrene, vinyl acetate, vinyl propionate, ethylene, propylene, isobutene, hydroxyalkyl (meth)acrylates, acrylamide, methacryl-amide, N-vinylpyrrolidone, allylsulfonic acid, methallylsulfonic acid, vinylsulfonic acid, vinylphosphonic acid, AMPS, methyl methacrylate, methyl acrylate, butyl acrylate, allylhexyl acrylate, etc.

The number of repeating structural units in the copolymers is not subject to any restrictions. However, copolymers having mean molecular weights of from 1000 to 100,000 g/mol have been found to be particularly advantageous.

The copolymers of the invention can be prepared in various ways. The important thing is that from 51 to 95 mol % of an unsaturated monocarboxylic or dicarboxylic acid derivative, from 1 to 48.9 mol % of an oxyalkylene alkenyl ether, from 0.1 to 5 mol % of a vinylic polyalkylene glycol, polysiloxane or ester compound and from 0 to 55 mol % of a dicarboxylic acid derivative are polymerized by means of a free-radical initiator.

As unsaturated monocarboxylic or dicarboxylic acid derivatives which form the structural units of the formula Ia, Ib or Ic, preference is given to using: acrylic acid, methacrylic acid, itaconic acid, itaconic anhydride, itaconimide and the monoamide of itaconic acid.

In place of acrylic acid, methacrylic acid, itaconic acid and the monoamide of itaconic acid, it is also possible to use monovalent or divalent metal salts, preferably sodium, potassium, calcium or ammonium salts.

If the acrylic, methacrylic or itaconic acid derivative is an ester, preference is given to using derivatives whose alcoholic component is a polyalkylene glycol of the general formula HO—(C$_m$H$_{2m}$O)$_n$—R$_2$, where R$^2$=H, an aliphatic hydrocarbon radical having from 1 to 20 carbon atoms, a cycloaliphatic hydrocarbon radical having from 5 to 8 carbon atoms, a substituted or unsubstituted aryl radical having from 6 to 14 carbon atoms and m=2 to 4 and n=0 to 200.

Preferred substituents on the aryl radical are —OH—, —COO$\ominus$ or —SO$_3\ominus$ groups.

The unsaturated monocarboxylic acid derivatives can be present only as monoesters, while in the case of the dicarboxylic acid itaconic acid, diester derivatives are also possible.

The derivatives of the formulae Ia, Ib and Ic can also be present as mixtures of esterified and free acids and are preferably used in an amount of from 55 to 75 mol %.

The second component used according to the invention for preparing the copolymers of the invention is an oxyalyklene glycol alkenyl ether which is preferably used in an amount of from 19.5 to 39.5 mol %. Preferred oxyalkylene glycol alkenyl ethers correspond to the formula V

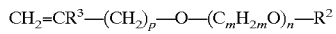

where R$^3$=H or an aliphatic hydrocarbon radical having from 1 to 5 carbon atoms and p=0 to 3. R$^2$, m and n are as defined above. The use of polyethylene glycol monovinyl ethers (p=0 and m=2) has been found to be particularly advantageous, with n preferably being from 1 to 50.

As third component used according to the invention for introducing the structural unit c), preference is given to using from 0.5 to 2 mol % of a vinylic polyalkylene glycol, polysiloxane or ester compound. Preferred vinylic polyalkylene glycol compounds are derivatives having the formula VI,

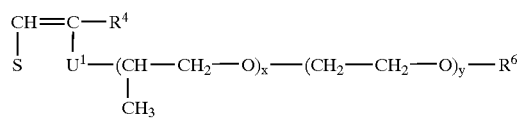

VI where S is —H or COO$_a$M and U$^1$ is —CO—NH—, —O— or —CH$_2$O—, i.e. the vinylic polyalkylene glycol compounds are the acid amide, vinyl or allyl ethers of the corresponding polypropylene glycol or polypropylene glycol-polyethylene glycol derivatives. x can be from 1 to 150 and y can be from 0 to 15. R$^6$ can either be as defined for R$^1$ or be

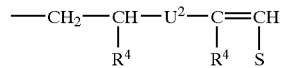

where U$^2$=—NH—CO—, —O— or —OCH$_2$— and S=—COO$_a$M and preferably —H.

In the case of R$^6$=R$^2$ and R$^2$ preferably being H, the compounds are the polypropylene glycol(-polyethylene glycol) monoamides or ethers of the corresponding acrylic (S=H, $R^4$=H), methacrylic (S=H, $R^4$=$CH_3$) or maleic (S=$COO_aM$-$R^4$=H) acid derivatives. Examples of such monomers are the N-(methyl-polypropylene glycol) monoamide of maleic acid, the N-(methoxy-polypropylene glycol-polyethylene glycol)-monoamide of maleic acid, polypropylene glycol vinyl ether and polypropylene glycol allyl ether.

In the case of $R^6 \neq R^2$, the compounds are bifunctional vinyl compounds whose polypropylene glycol(-polyethylene glycol) derivatives are joined to one another via amide or ether groups (—O— or —$OCH_2$—). Examples of such compounds are polypropylene glycol bismaleamide, polypropylene glycol diacrylamide, polypropylene glycol dimethacrylamide, polypropylene glycol divinyl ether, polypropylene glycol diallyl ether.

As vinylic polysiloxane compound, preference is given to derivatives corresponding to the formula VII,

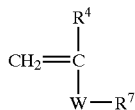

VII where $R^4$=—H or $CH_3$,

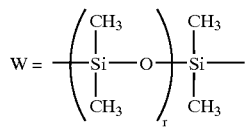

and r=2 to 100 and $R^7=R^2$. Examples of such monomers are monovinylpolydimethylsiloxane.

Further vinylic polysiloxane compounds which can be used are derivatives of the formula VIII,

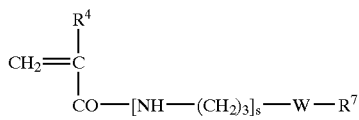

VIII where s=1 or 2, $R^4$ and W are as defined above and $R^7$ can either be as defined for $R^2$ or be

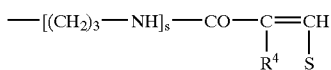

and S is as defined above and is preferably hydrogen or —$COOR^5$.

Examples of such monomers having a vinyl function ($R^7=R^2$) are polydimethylsiloxanepropylmaleamide or polydimethylsiloxanedipropyleneaminomaleamide. In the case of $R^7 \neq R^2$, the compounds are divinyl compounds such as polydimethylsiloxanebis(propylmaleamide) or polydimethylsiloxanebis(dipropyleneaminomaleamide).

As further vinylic polysiloxane compound, preference is given to using a derivative corresponding to the formula IX:

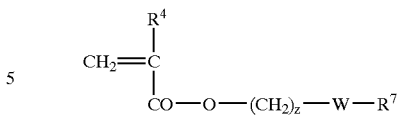

IX where z is from 0 to 4 and $R^4$ and W are as defined above. $R^7$ can either be as defined for $R^2$ or be

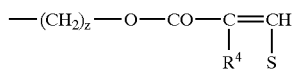

where S is as defined above and is preferably hydrogen. Examples of such monovinylic compounds ($R^7=R^1$) are polydimethylsiloxane(1-propyl 3-acrylate) or polydimethylsiloxane(1-propyl 3-methacrylate).

In the case of $R^7 \neq R^2$, the compounds are divinyl compounds such as polydimethylsiloxanebis(1-propyl 3-acrylate) or polydimethylsiloxanebis(1-propyl 3-methacrylate).

Vinylic ester compounds used for the purposes of the present invention are preferably derivatives of the formula X, $$\begin{array}{cc} CH=CH \\ | \quad | \\ S \quad COOR^5 \end{array}$$

X where S=$COO_aM$ or —$COOR^5$ and $R^5$ is an aliphatic hydrocarbon radical having from 3 to 20 carbon atoms, a cycloaliphatic hydrocarbon radical having from 5 to 8 carbon atoms or an aryl radical having from 6 to 14 carbon atoms. a and M are as defined above. Examples of such ester compounds are di-n-butyl maleate or fumarate or mono-n-butyl maleate or fumarate.

Furthermore, it is also possible to use compounds of the formula XI

XI where z is from 0 to 4 and $R^2$ is as defined above. V can also be as defined for W (i.e. a polydimethyl-siloxane group), which corresponds to a dialkenyl-polydimethylsiloxane compound such as divinylpoly-dimethylsiloxane. Alternatively, V can also be —O—CO—$C_6H_4$—CO—O—. These compounds are dialkenyl phthalic acid derivatives. A typical example of such a phthalic acid derivative is diallyl phthalate.

The molecular weights of the compounds which form the structural unit c) can be varied within wide limits and are preferably in the range from 150 to 10,000.

As fourth component for preparing the copolymers of the invention, preference is given to using from 5 to 20mol % of an unsaturated dicarboxylic acid derivative of the formula XIII:

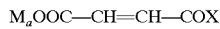 XII where a, M and X are as defined above.

When X=$OM_a$, the unsaturated dicarboxylic acid derivative is derived from maleic acid, fumaric acid, monovalent or divalent metal salts of these dicarboxylic acids, e.g. the sodium, potassium, calcium or ammonium salt or salts with an organic amine radical. Monomers which form the unit Ia can further comprise polyalkylene glycol monoesters of the abovementioned acids having the general formula XIII:

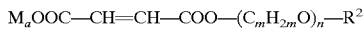

where a, m, n and $R^2$ are as defined above.

The fourth component can be derived from unsaturated dicarboxylic anhydrides and imides of the general formula XIV (5 to 20 mol %)

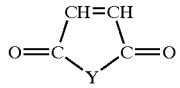

XIV where Y is as defined above.

In a preferred embodiment of the invention, further monomers as described above can be used in amounts of up to 50 mol %, preferably up to 20 mol %, based on the sum of the structural units a) to d).

The copolymers of the invention can be prepared by the customary copolymerization methods. A particular advantage is that, according to the invention, the copolymerization can be carried out without solvents or else in aqueous solution. In both cases, the reactions are carried out under atmospheric pressure and therefore do not pose a safety problem.

If the process is carried out in aqueous solution, the polymerization is carried out at from 20 to 100° C. with the aid of a customary free-radical initiator, with the concentration of the aqueous solution preferably being set to from 30 to 50% by weight. In a preferred embodiment, the free-radical polymerization is carried out in the acid pH range, in particular at a pH of from 4.0 to 6.5, with conventional initiators such as $H_2O_2$ being able to be used without there being a risk of ether cleavage, as a result of which the yields would be greatly reduced.

In the process of the invention, preference is given to placing the unsaturated dicarboxylic acid derivative which forms the structural unit d) in partially neutralized form in aqueous solution, preferably together with the polymerization initiator, in a reaction vessel and introducing the remaining monomers as soon as the initial charge has reached the required reaction temperature. Polymerization aids which reduce the activation threshold of the preferably peroxidic initiator can be added separately, so that the copolymerization can occur at relatively low temperatures. In a further, preferred embodiment, the unsaturated dicarboxylic acid derivative and also the free-radical initiator are metered into the initial charge in the reactor in separate streams or in a common stream. This provides an ideal solution to the problem of heat removal.

However, it is also possible to place the polyoxyalkylene glycol alkenyl ethers which form the structural unit b) in the reaction vessel and to introduce the monocarboxylic or dicarboxylic acid derivative (structural unit a)) in such a way that a uniform distribution of the monomer units over the polymer chain is achieved.

The type of polymerization initiators, polymerization activators and other auxiliaries, e.g. molecular weight regulators, used is not critical. Initiators which can be used are the customary free-radical formers such as hydrogen peroxide, sodium, potassium or ammonium peroxodisulfate, tert-butyl hydroperoxide, dibenzoyl peroxide, sodium peroxide, 2,2'-azobis(2-amidinopropane) dihydrochloride, azobisisobutyro-nitrile, etc. If redox systems are used, it is, for example, possible to combine the above-mentioned initiators with activators having a reducing action. Examples of such reducing agents are Fe(II) salts, sodium hydroxymethanesulfinate dihydrate, alkali metal sulfites and metabisulfites, sodium hypophosphite, hydroxylamine hydrochloride, thiourea, etc.

A particular advantage of the copolymers of the invention is that they can also be prepared without solvents, which can be achieved with the aid of customary free-radical initiators at temperatures of from 60 to 150° C. This variant is particularly advantageous for economic reasons when the copolymers of the invention are to be used directly in water-free form, because costly removal of the solvent, in particular water (for example by spray drying), then becomes unnecessary.

The copolymers of the invention are very useful as additives for aqueous suspensions of inorganic and organic solids, in particular those based on mineral or bituminous binders such as cement, plaster of Paris, lime, anhydrite or other building materials based on calcium sulfate, or based on pulverulent dispersion binders which are advantageously used in an amount of from 0.01 to 10% by weight, in particular from 0.05 to 5% by weight, based on the weight of the mineral binder. However, the copolymers of the invention can also be used very successfully in the fields of ceramic compositions, refractory compositions and oilfield chemicals.

The following examples illustrate the invention.

EXAMPLES

Example 1

3300 g (3.00 mol) of methylpolyethylene glycol 1100 monovinyl ether (mean molecular weight: 1100 g/mol) were placed as a melt at 50° C. in a 10 l double-walled reaction vessel provided with thermometer, stirrer, reflux condenser and two inlets for separate feed streams. 3200 g of tap water were added, giving a strongly alkaline aqueous solution of the vinyl ether. While stirring and cooling, 58.80 g (0.60 mol) of maleic anhydride dissolved in 137.20 g of water (corresponding to a 30% strength solution) and, separately, 10.86 g of 20% strength aqueous sodium hydroxide were added, with the temperature being kept below 30° C.

33.00 g (0.0165 mol) of a reaction product of a butanol-initiated bifunctional $NH_2$-terminated ethylene oxide-propylene oxide block polymer (EO 4, PO 27; molecular weight: 1800 g) with maleic anhydride were subsequently added with brief intensive stirring, and 930 mg of $FeSO_4 \cdot 7H_2O$, 5.97 g of 3-mercaptopropionic acid and 34.40 g of 50% strength aqueous hydrogen peroxide were added in succession. At a temperature of 30° C., 281.00 g (3.90 mol) of acrylic acid dissolved in 843 g of tap water (25% strength solution) comprising an additional 17.90 g of 3-mercaptopropionic acid as regulator were subsequently added to the initial charge over a period of 75 minutes. 252 ml of a 2% strength aqueous solution of sodium hydroxymethanesulfinate dihydrate were metered in separately over a period of 97 minutes, with the temperature rising to a maximum of 35.8° C.

After the addition was complete, the mixture was stirred for another 15 minutes at 30° C. and brought to a pH of 6.50 by addition of 801.70 g of 20% strength aqueous sodium hydroxide. The yellowish, turbid aqueous composition contained 41.6% by weight of solids. The weight average molecular weight of the copolymer was 35,350 g/mol; yield: 9220 g.

Example 2

The procedure of Example 1 was repeated, but a vinyl ether having a mean molecular weight of 2000 g/mol was used in place of the vinyl ether (MW=1100) used in Example 1.

The following amounts of the structure-forming components were used:

- 205.60 g (2.853 mol) of acrylic acid
- 3156.80 g (1.5784 mol) of methylpolyethylene glycol 2000 monovinyl ether
- 47.35 g (0.025 mol) of poly(PO-block-EO)maleamide (MW: 1900 g/mol)
- 92.80 g (0.946 mol) of maleic anhydride
- 8705.2 g of a turbid, yellowish product having a solids content of 42.0% by weight were obtained. The weight average molecular weight was 32,150 g/mol.

Example 3

Example 1 was repeated, but 218.40 g (1.95 mol) of itaconic anhydride as a 25% strength aqueous solution were used as feed stream 1 in place of the acrylic acid used in Example 1. The aqueous copolymer obtained after neutralization with aqueous sodium hydroxide (25%) had a weight average molecular weight of 25,400 g/mol (solids content: 43.0% by weight).

Example 4

The procedure of Example 1 was repeated, with the following changes being made:

In addition to the initially charged

- 58.80 g (0.60 mol) of maleic anhydride
- 3300.00 g (3.00 mol) of methylpolyethylene glycol 1100 monovinyl ether
- 33.00 g (0.0165 mol) of poly(EO-block-PO)maleamide, an addition of
- 175.00 g (0.50 mol) of a methylpolyethylene glycol methacrylate (MW=350 g/mol) was made to the initial charge.

The proportion of acrylic acid in feed stream 1 remained unchanged (3.90 mol). As in Example 1, a yellowish, turbid storage-stable aqueous suspension having a solids content of 42.7% by weight (M=39,900 g/mol, yield: 9402 g).

Example 5

A copolymer of

- 1.37 mol of methacrylic acid (feed stream)
- 0.68 mol of ethylene glycol monovinyl ether (initial charge)
- 0.005 mol of poly($EO_4$-block-$PO_{27}$)maleic monoamide (initial charge)
- 0.55 mol of methylpolyethylene glycol 1100 monomaleate (initial charge)
- 0.10 mol of maleic anhydride (feed stream)

was prepared as described in Example 1, but with a 25% strength aqueous solution of methacrylic acid being added instead of acrylic acid. Furthermore, an additional feed stream consisting of a 25% strength solution of maleic anhydride in water was used. In addition, methylpolyethylene glycol 1100 monomaleate was used in the initial charge.

The white aqueous turbid end product obtained had a polymer content of 43.7% by weight at a mean molecular weight of 36,500 g/mol.

Example 6

Example 1 was repeated, but 78.00 g (0.75 mol) of styrene were additionally dispersed in the initial charge. The odorless end product had a light yellow color (solids content: 42.0% by weight; MW=37,000 g/mol).

Example 7

Example 1 was repeated, but using a pure polypropylene glycol bismaleamide (MW=2000) in an amount of 30.00 g (0.150 mol) being used in place of the reaction product of poly(EO-block-PO)amine with maleic anhydride.

Solids content of the end product: 41.3% by weight
Weight average molecular weight: 36,400 g/mol

Examples 8 to 10

In Examples 8, 9 and 10, the following components to combat introduction of air were used (otherwise as in Example 1):

Example 8: 0.010 mol of polydimethylsiloxane bis-(1-propyl 3-methacrylate) (MW=1100)

Example 9: 0.350 mol of di-n-butyl maleate

Example 10: 0.0075 mol of polydimethylsiloxane bis-(dipropyleneaminomaleamide) (MW 5400)

In the Use Examples 1 and 2 described below, copolymers from Examples 1 to 10 according to the invention were compared with the known concrete additives of Comparative Examples 1 to 3.

Example 11

The following were placed in a 500 ml double-walled reaction vessel:

24.2 g of methylpolyethylene glycol 1100 monovinyl ether (0.022 mol), made inert with $N_2$ and heated to 85° C.

The following were added as three separate feed streams over a period of 120 minutes:

1. 25.48 g (0.26 mol) of maleic anhydride dissolved in 217.8 g (0.198 mol) of methylpolyethylene glycol 1100 monovinyl ether plus 2.68 g (0.01 mol) of dibutyl maleate (temperature of the feed stream: 50° C.)
2. 36.72 g (0.51 mol) of acrylic acid
3. 6.14 g of azobisisobutyronitrile in 50 ml of acetone After the addition was complete, the mixture was allowed to react further for 2 hours while simultaneously removing the acetone.

The product (brown) was diluted with an equal amount (about 307 g) of water and neutralized to pH 7.0 using 20% strength aqueous sodium hydroxide.

Solids content of the end product: 38.0% by weight
Molecular weight (weight average): 30,200 g/mol
Appearance: turbid, brown

Comparative Example 1

Commercial concrete fluidizer "Melment L 10" based on a sulfonated melamine-formaldehyde polycondensate.

Comparative Example 2

Maleic monoester-styrene copolymer having the trade name POZZOLITH 330 N.

Comparative Example 3

Example 1 of DE 195 13 126 A1 was replicated and the product obtained was employed as a comparison.

The aqueous copolymer compositions of the invention and the compositions from the three comparative examples were compared as fluidizers in tests carried out on cement-containing suspensions.

These tests demonstrated the excellent processing properties (slump loss method) of the group of aqueous products according to the invention in a transport concrete formulation, while their tendency to achieve very high early strengths as a result of an extremely high reduction in the water:cement ratio is demonstrated in a formulation for producing finished concrete parts.

Use Example 1

Transport Concrete Production

In accordance with the appropriate standard, 4.5 kg of Portland cement (CEM I 42.5 R Kiefersfelden) were mixed with 33.0 kg of aggregates (particle size from 0 to 32 mm) and 2.7 kg of water (including the water from the additive) in a cement mixer.

The aqueous solutions of the products according to the invention or the comparative products were added and the slump was determined in accordance with DIN 1048 (duplicate determination) after 10 and 40 minutes after addition of the additive.

Subsequent to the measurements of the slump after 10 minutes, test specimens having an edge length of 15×15×15 cm were produced and the compressive strength after 24 hours and the proportion of air pores (from the bulk density of the cured test specimens) were determined.

The results are shown in Table 1:

TABLE 1

Transport concrete test results

| Additive | Solids [% w/w] | Amount[1] [% w/w] | Slump in cm after 10 min. | Slump in cm after 40 min. | Air [% w/w] | 24 h comp. strength [MPa] |
|---|---|---|---|---|---|---|
| Ex. 1 | 41.6 | 0.20 | 67.00 | 58.50 | 2.1 | 14.4 |
| Ex. 2 | 42.0 | 0.25 | 65.50 | 59.00 | 2.4 | 14.6 |
| Ex. 3 | 43.0 | 0.20 | 63.25 | 56.50 | 1.9 | 15.0 |
| Ex. 4 | 42.7 | 0.20 | 62.75 | 57.00 | 2.3 | 14.0 |
| Ex. 5 | 43.7 | 0.20 | 65.00 | 56.00 | 2.6 | 14.2 |
| Ex. 6 | 42.0 | 0.20 | 62.75 | 55.75 | 2.9 | 15.3 |
| Ex. 7 | 41.3 | 0.20 | 67.25 | 57.00 | 1.7 | 14.9 |
| Ex. 8 | 41.5 | 0.20 | 65.75 | 56.25 | 1.4 | 15.1 |
| Ex. 9 | 42.3 | 0.20 | 67.75 | 60.00 | 3.0 | 14.0 |
| Ex. 10 | 42.0 | 0.20 | 66.50 | 59.00 | 1.3 | 15.2 |
| Comp. Ex. 1 | 45.3 | 0.58 | 57.25 | 41.00 | 1.6 | 15.0 |
| Comp. Ex. 2 | 34.9 | 0.25 | 53.75 | 44.75 | 2.5 | 13.7 |
| Comp. Ex. 3 | 37.0 | 0.25 | 58.50 | 48.50 | 1.9 | 11.3 |

[1]Polymer solids based on the weight of cement 280 kg of CEM I/m³ of concrete

Use Example 2

Formulation for Finished Concrete Parts

The tests were carried out as described in Use Example 1, but using 5.75 kg of cement, 2.3 kg of water (including water from the additive) and 33.0 kg of aggregate having a slightly altered particle size distribution.

The results are shown in Table 2:

TABLE 2

Test results for selected products in concrete for finished parts

| Additive | Solids [% w/w] | Amount[1] [% w/w] | Slump in cm after 10 min. | Slump in cm after 40 min. | Air [% w/w] | 24 h comp. strength [MPa] |
|---|---|---|---|---|---|---|
| Ex. 1 | 41.6 | 0.30 | 56.50 | 53.25 | 1.8 | 39.6 |
| Ex. 2 | 42.0 | 0.24 | 60.75 | 56.50 | 1.4 | 40.4 |
| Ex. 3 | 43.0 | 0.30 | 59.25 | 55.00 | 1.9 | 38.9 |
| Ex. 6 | 42.3 | 0.30 | 56.75 | 54.75 | 2.4 | 40.1 |
| Ex. 7 | 41.3 | 0.30 | 60.00 | 54.25 | 1.3 | 39.9 |
| Comp. Ex. 1 | 45.3 | 0.92 | 37.50 | — | 1.4 | 38.7 |
| Comp. Ex. 2 | 34.9 | 0.30 | 48.50 | 40.00 | 1.9 | 34.6 |
| Comp. Ex. 3 | 37.0 | 0.30 | 49.75 | 43.25 | 1.7 | 19.4 |

[1]Polymer solids based on the weight of cement 350 kg of CEM I/m³ of concrete

What is claimed is:

1. A copolymer based on radicals of unsaturated monocarboxylic or dicarboxylic acid derivatives and oxyalkylene glycol alkenyl ethers, comprising
   a) from 51 to 95 mol % of structural units of the formula Ia and/or Ib and/or Ic

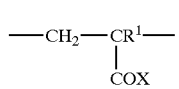

Ia

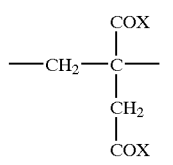

Ib

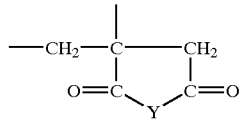

Ic where $R^1$=hydrogen or an aliphatic hydrocarbon radical having from 1 to 20 carbon atoms, $X=O_aM$, $—O—(C_mH_{2m}O)_n—R^2$, $—NH—(C_mH_{2m}O)_n—R^2$, M=hydrogen, a monovalent or divalent metal cation, an ammonium ion or an organic amine radical, a=½ or 1, $R^2$=hydrogen, an aliphatic hydrocarbon radical having from 1 to 20 carbon atoms, a cycloaliphatic hydrocarbon radical having from 5 to 8 carbon atoms, a substituted or unsubstituted aryl radical having from 6 to 14 carbon atoms, $Y=O, NR^2$, m=2 to 4 and n=0 to 200, b) from 1 to 48.9 mol % of structural units of the general formula II

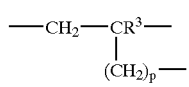

II where $R^3$=is hydrogen or an aliphatic hydrocarbon radical having from 1 to 5 carbon atoms, p is from 0 to 3, and $R^2$, m and n are as defined above, c) from 0.1 to 5 mol % of structural units of the formula selected from one of IIIa and IIIb

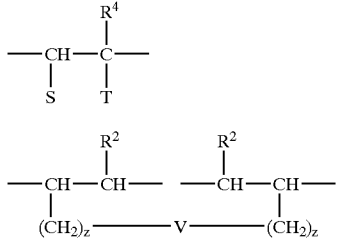
IIIa

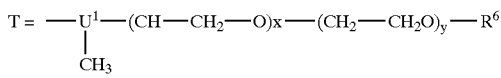
IIIb where

S=H, —COO$_a$M, —COOR$^5$,

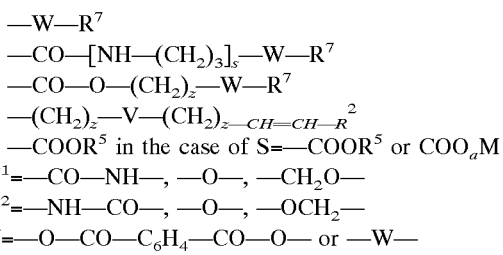

—W—R$^7$
—CO—[NH—(CH$_2$)$_3$]$_s$—W—R$^7$
—CO—O—(CH$_2$)$_z$—W—R$^7$
—(CH$_2$)$_z$—V—(CH$_2$)$_{z-CH=CH-R}^2$
—COOR$^5$ in the case of S=—COOR$^5$ or COO$_a$M
U$^1$=—CO—NH—, —O—, —CH$_2$O—
U$^2$=—NH—CO—, —O—, —OCH$_2$—
V=—O—CO—C$_6$H$_4$—CO—O— or —W—

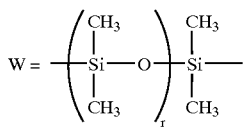

$R^4$=H, CH$_3$, $R^5$=an aliphatic hydrocarbon radical having from 3 to 20 carbon atoms, a cycloaliphatic hydrocarbon radical having from 5 to 8 carbon atoms, an aryl radical having from 6 to 14 carbon atoms,

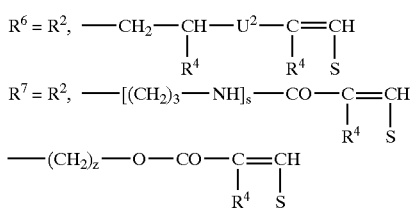

r=2 to 100
s=1, 2
z=0 to 4
x=1 to 150
y=0 to 15 and d) from 0 to 47.9 mol of structural units of the general formula selected from one or both of IVa and Ivb

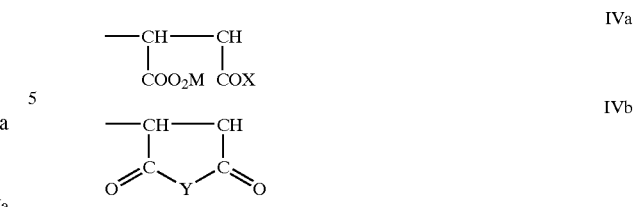

where a, M, X and Y are as defined above.

2. The copolymer according to claim 1, wherein $R^1$ is a methyl radical.

3. The copolymer according to claim 1, wherein M is a monovalent or divalent metal cation selected from the group consisting of sodium, potassium, calcium and magnesium ions.

4. The copolymer according to any of claim 1, wherein when $R^2$=phenyl, the phenyl radical is substituted by one or more hydroxyl, carboxyl or sulfonic acid groups.

5. The copolymer according to claim 1, wherein in formula II, p=0 and m=2.

6. The copolymer according to claim 1, wherein it comprises from 55 to 75 mol % of structural units selected from one or more of formula Ia, Ib and Ic, from 19.5 to 39.5 mol % of structural units of the formula II, from 0.5 to 2 mol % of structural units selected from one or more of formula IIIa and IIIb and from 5 to 20 mol % of structural units selected from one or more of formula IVa and IVb.

7. The copolymer according to claim 1, wherein it further comprises up to 50 mol % based on the sum of the structural units of the formulae I, II, III and IV, of structural units whose monomer is a vinyl or (meth)acrylic acid derivative.

8. The copolymer according to claim 7, wherein the additional structural units are formed from a monomeric vinyl derivative styrene, a-methylstyrene, vinyl acetate, vinyl propionate, ethylene, propylene, isobutene, n-vinyl-pyrrolidone, allylsulfonic acid, methallylsulfonic acid, vinylsulfonic acid or vinylphosphonic acid.

9. The copolymer according to claim 7, wherein the additional structural units are formed from a monomeric (meth)acrylic acid derivative hydroxyalkyl (meth)acrylate, acrylamide, methacrylamide, AMPS, methyl methacrylate, methyl acrylate, butyl acrylate or cyclohexyl acrylate.

10. The copolymer according to any of claim 1, wherein it has a mean molecular weight of from 1000 to 100,000 g/mol.

11. A process for preparing a copolymer according to claim 1, wherein from 51 to 95 mol % of an unsaturated monocarboxylic or dicarboxylic acid derivative, from 1 to 48.9 mol % of an oxyalkylene glycol alkenyl ether, from 0.1 to 5 mol % of a vinylic polyalkylene glycol, polysiloxane or ester compound and from 0 to 55 mol % of a dicarboxylic acid derivative are polymerized with the aid of a free-radical initiator.

12. The process according to claim 11, wherein from 55 to 75 mol % of an unsaturated monocarboxylic or dicarboxylic acid derivative, from 19.5 to 39.5 mol % of an oxyalkylene glycol alkenyl ether, from 0.5 to 2 mol % of a vinylic polyalkylene glycol, polysiloxane or ester compound and from 5 to 20 mol % of a dicarboxylic acid derivative are used.

13. The process according to claim 11, wherein up to 50 mol %, in particular up to 20 mol %, based on the monomers comprising the structural units of the formulae I, II, III and IV, of a vinyl or (meth)acrylic acid derivative are additionally copolymerized.

14. The process according to claim 11, wherein the polymerization is carried out in aqueous solution at a temperature of from 20 to 100° C.

15. The process according to claim 14, wherein the concentration of the aqueous solution is from 30 to 50% by weight.

16. The process according to claim 11, wherein the polymerization is carried out without solvents with the acid of a free-radical initiator at temperatures of from 20 to 150° C.

17. An aqueous suspension comprising mineral binder and the copolymer of claim 1.

18. The aqueous suspension of claim 17, wherein said copolymer is present in an amount of from 0.01 to 10% by weight, based on the weight of the mineral binder.

19. An aqueous suspension comprising a bituminous binder and the copolymer of claim 1.

20. The aqueous suspension of claim 19, wherein said copolymer is present in an amount of from 0.01 to 10% by weight, based on the weight of the bituminous binder.

* * * * *